United States Patent
Oda (10) Patent No.: US 10,840,510 B2
(45) Date of Patent: Nov. 17, 2020

(54) POSITIVE ELECTRODE ACTIVE MATERIAL FOR NON-AQUEOUS ELECTROLYTE SECONDARY BATTERY AND METHOD FOR PRODUCING SAME

(71) Applicant: SUMITOMO METAL MINING CO., LTD., Tokyo (JP)

(72) Inventor: Syuhei Oda, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 452 days.

(21) Appl. No.: 15/329,599

(22) PCT Filed: Jul. 30, 2015

(86) PCT No.: PCT/JP2015/071725
§ 371 (c)(1),
(2) Date: Jan. 27, 2017

(87) PCT Pub. No.: WO2016/017783
PCT Pub. Date: Feb. 4, 2016

(65) Prior Publication Data
US 2017/0207453 A1    Jul. 20, 2017

(30) Foreign Application Priority Data
Jul. 31, 2014  (JP) .................................. 2014-157246

(51) Int. Cl.
*H01M 4/02* (2006.01)
*H01M 4/505* (2010.01)
(Continued)

(52) U.S. Cl.
CPC .......... *H01M 4/505* (2013.01); *C01G 53/006* (2013.01); *C01G 53/50* (2013.01); *H01M 4/0471* (2013.01);
(Continued)

(58) Field of Classification Search
CPC ...................................... H01M 4/02
See application file for complete search history.

(56) References Cited

U.S. PATENT DOCUMENTS

2004/0180263 A1  9/2004 Kase et al.
2007/0202405 A1  8/2007 Shizuka et al.
(Continued)

FOREIGN PATENT DOCUMENTS

EP  1447866 A1  8/2004
EP  1742281 A1  1/2007
(Continued)

OTHER PUBLICATIONS

International Search Report and Written Opinion dated Oct. 27, 2015, from the corresponding PCT/JP2015/071725.
(Continued)

*Primary Examiner* — Jacob B Marks
(74) *Attorney, Agent, or Firm* — Katten Muchin Rosenman LLLP (57) ABSTRACT

Provided is a positive electrode active material that is capable of improving output characteristics when used as positive electrode material for a non-aqueous electrolyte secondary battery. A lithium mixture that is obtained by adding and mixing a lithium compound to a transition metal composite hydroxide that was obtained from a crystallization reaction undergoes calcination in an atmosphere having an oxygen concentration of 4% by volume or greater. In this calcination process, carbon dioxide gas concentration in the atmosphere while the temperature is maintained at a calcination temperature is kept at 10% by volume or less, and preferably kept at 0.01% by volume to 10% by volume. As a result, positive electrode active material is obtained that includes a lithium transition metal composite oxide that is composed of secondary particles that are formed from aggregates of plural primary particles, and that has a carbon content of 0.010% by mass to 0.100% by mass.

4 Claims, 1 Drawing Sheet

(51) Int. Cl.
   *H01M 4/525* (2010.01)
   *C01G 53/00* (2006.01)
   *H01M 4/04* (2006.01)
   *H01M 4/131* (2010.01)
   *H01M 10/0525* (2010.01)
   *H01M 10/052* (2010.01)

(52) U.S. Cl.
   CPC .......... *H01M 4/131* (2013.01); *H01M 4/525* (2013.01); *H01M 10/0525* (2013.01); *C01P 2002/50* (2013.01); *C01P 2002/52* (2013.01); *C01P 2004/50* (2013.01); *C01P 2004/61* (2013.01); *C01P 2006/40* (2013.01); *C01P 2006/80* (2013.01); *H01M 10/052* (2013.01)

(56) References Cited

U.S. PATENT DOCUMENTS

| | | |
|---|---|---|
| 2008/0241647 A1 | 10/2008 | Fukui et al. |
| 2009/0104530 A1 | 4/2009 | Shizuka et al. |
| 2010/0221613 A1 | 9/2010 | Ueki et al. |
| 2011/0086274 A1* | 4/2011 | Chang ................... H01M 4/505 429/223 |
| 2011/0281168 A1 | 11/2011 | Watanabe et al. |
| 2012/0119167 A1 | 5/2012 | Matsumoto et al. |
| 2012/0270107 A1 | 10/2012 | Toya et al. |
| 2014/0011090 A1 | 1/2014 | Toya et al. |
| 2014/0054495 A1 | 2/2014 | Paulsen et al. |
| 2014/0162119 A1 | 6/2014 | Takei et al. |
| 2014/0175337 A1* | 6/2014 | Chern ................ C07D 207/452 252/506 |
| 2014/0186709 A1 | 7/2014 | Iwanaga et al. |

FOREIGN PATENT DOCUMENTS

| | | | |
|---|---|---|---|
| EP | 2520547 | A1 | 11/2012 |
| JP | 2004-214187 | A | 7/2004 |
| JP | 2004-253174 | * | 9/2004 |
| JP | 2004-327246 | A | 11/2004 |
| JP | 2005-340186 | A | 12/2005 |
| JP | 2009032647 | A | 2/2009 |
| JP | 2009-99462 | A | 5/2009 |
| JP | 2010-155775 | A | 7/2010 |
| JP | 2011-34861 | A | 2/2011 |
| JP | 2011-116580 | A | 6/2011 |
| JP | 2013-021699 | A | 1/2013 |
| JP | 2013-026199 | A | 2/2013 |
| JP | 2013-65409 | A | 4/2013 |
| JP | 2014-509046 | A | 4/2014 |
| JP | 2014-118335 | A | 6/2014 |
| JP | 2014-135273 | A | 7/2014 |
| WO | 2012/131881 | A1 | 10/2012 |
| WO | 2013131881 | | 9/2013 |

OTHER PUBLICATIONS

Extended Search Report dated Feb. 9, 2018, from the corresponding 15828299.6.
Notification of Reasons for Refusal dated Apr. 23, 2019, from the corresponding Japanese Application No. 2016-538454, 3 sheets.
Notification of Reasons for Refusal dated Feb. 18, 2020, from the corresponding Japanese Application No. 2016-538454, 4 sheets.
Communication pursuant to Article 94(3) EPC dated Feb. 28, 2020, from European Patent Application No. 15828299.6-1106, 7 sheets.
Notification of Reasons for Refusal dated Sep. 10, 2019, from the corresponding Japanese Application No. 2016-538454, 5 sheets.

* cited by examiner

POSITIVE ELECTRODE ACTIVE MATERIAL FOR NON-AQUEOUS ELECTROLYTE SECONDARY BATTERY AND METHOD FOR PRODUCING SAME

TECHNICAL FIELD

The present invention relates to a positive electrode active material for a non-aqueous electrolyte secondary battery, and to a method for producing that positive electrode active material. Moreover, the present invention relates to a non-aqueous electrolyte secondary battery that uses the positive electrode active material for a non-aqueous electrolyte secondary battery as positive electrode material.

BACKGROUND ART

Recently, as portable electronic devices such as portable telephones and notebook personal computers become popular and widespread, there is a large need for the development of compact and lightweight secondary batteries that have a high energy density. There is also a large need for the development of secondary batteries having a large output to be used as batteries for the power sources of motor-driven equipment, and particularly for the power sources of transport equipment.

There are lithium-ion secondary batteries, which are one kind of non-aqueous electrolyte secondary battery, that are used as secondary batteries that satisfy needs such as these. A lithium-ion secondary battery includes a negative electrode, a positive electrode, and an electrolyte, and as the active material for the negative electrode and positive electrode, a material that is capable of the insertion and desorption of lithium is used.

Currently, much research and development is being performed for various kinds of lithium-ion secondary batteries, and of these batteries, lithium-ion secondary batteries that use a layered or spinel-type lithium metal composite oxide for the positive electrode material are capable of obtaining a 4V grade high voltage, so implementation of such batteries as batteries having high energy density is advancing.

Currently, as the positive electrode material for this kind of lithium-ion secondary battery, a lithium transition metal composite oxide such as lithium cobalt composite oxide ($LiCoO_2$) of which composition is comparatively easy, lithium nickel composite oxide ($LiNiO_2$) that uses nickel that is less expensive than cobalt, lithium nickel cobalt manganese composite oxide ($LiNi_{1/3}Co_{1/3}Mn_{1/3}O_2$), lithium manganese composite oxide ($LiMn_2O_4$) that uses manganese, lithium nickel manganese composite oxide ($LiNi_{0.5}Mn_{0.5}O_2$) is proposed. Even of these positive electrode active materials, materials that do not use cobalt of which there are small reserves, such as lithium nickel composite oxide that can achieve high capacity, or lithium nickel manganese composite oxide that has excellent thermal stability are attracting much attention.

As a method for obtaining these kinds of lithium transition metal composite oxides, there is a method of mixing a transitional metal composite hydroxide that was obtained by a crystallization reaction with a lithium compound, and performing calcination of this obtained mixture. However, with this method, there is a problem in that unreacted lithium that adheres to the surface of particles of positive electrode active material becomes carbonized, which adversely affects the characteristics, and particularly the output characteristics, of the secondary battery that is obtained.

As measures against such a problem, JP2013026199 (A) discloses suppressing the amount of carbon in the positive electrode active material to 0.08% by mass or less by making a slurry of lithium nickel composite oxide after the calcination process, and performing a washing process while controlling the electric conductivity of the liquid portion of the slurry to be 30 mS/cm to 60 mS/cm in a temperature range of 10° C. to 40° C. With this kind of positive electrode active material, it is possible to achieve both high capacity and excellent thermal stability, and it is further considered that high output can also be obtained.

However, with this kind of production method, as the number of processes increases, there is also a possibility that productivity will worsen and production costs will increase. Moreover, in the case that the conditions of the washing process are not suitable, such as performing washing excessively in order to decreases the amount of carbon contained, there is a possibility that the characteristics of the secondary battery will not be sufficiently improved due to excessive elution of lithium in the washing solution, or due to the generation of oxyhydroxides or the like.

JP2005340186 (A) discloses a positive electrode active material that is obtained by making a granulated powder by performing crushing until the average particle size becomes 0.3 μm or less, spraying and drying the wet-mixed raw material powder, then performing calcination of this granulated powder in an inert gas atmosphere at 800° C. or greater, being expressed by the general expression: $Li_{1+z}Ni_xMn_yCo_{1-x-y}O_\delta$ (where, $0<z\le0.91$, $0.1\le x\le0.55$, $0.20\le y\le0.90$, $0.50\le x+y\le1$, $1.9\le\delta\le3$), the volume resistivity when compressed at a pressure of 40 MPa is $5\times10^5$ Ω·cm or less, and when the carbon concentration is taken to be C (% by mass), and the BET specific surface area is taken to be S ($m^2/g$), the C/S value is 0.025 or less. According to JP2005340186 (A), by making the raw material have a high specific surface area, the reactivity of the raw material powder and lithium compound improves, so in the positive electrode active material that is obtained, it is possible to reduce the carbon content that occurs due to unreacted lithium, and thus it is possible to obtain a positive electrode active material having excellent battery characteristics.

However, this production method is based on the premise that granulated powder that is obtained by spraying and drying is used as a precursor to the positive electrode active material, and so cannot be applied to a production method of a positive electrode active material that is based on the premise that a nickel composite hydroxide that is obtained from a crystallization reaction is used as a precursor. In addition, the C/S value is controlled by improving reactivity during calcination by selection of raw material, the particle size of raw material, high specific surface area of the raw material, improving the mixture of raw material and the like, so it is difficult to optimize the C/S value by controlling only the carbon content.

Moreover, JP2004327246 (A) discloses a positive electrode active material that is obtained by mixing a nickel composite hydroxide and a lithium hydroxide, and performing calcination of this mixture in an oxidizing atmosphere in which the concentration of carbon dioxide gas is 50 ppm per volume or less and at a temperature of 700° C. to 800° C., being expressed by the general expression: $Li_x(Ni_{1-y}Co_y)_{1-z}M_zO_2$ (where, $0.98\le x\le1.10$, $0.05\le y\le0.4$, $0.01\le z\le0.2$, and M is selected from among the group of Al, Zn, Ti and Mg). With a positive electrode active material that is obtained from this kind of method, it is possible to suppress the amount of $Li_2CO_3$ that covers the surface of the material, and by using this positive electrode active material as the positive electrode material, it is considered possible to obtain a secondary battery that has high capacity and excellent output characteristics.

However, in this production method, a LiNiCo type positive electrode active material that includes a high concentration of nickel is taken to be the object, and a LiNiMn type or LiNiMnCo type of positive electrode active material are not taken to be the object. In other words, the LiNiCo type of positive electrode active material that is disclosed in JP2004327246 (A) has excellent battery capacity, however, does not necessarily have excellent thermal stability. In addition, in this method, when producing a LiNiCo type positive electrode active material in which an excessive amount of lithium exists on the particle surfaces, $Li_2CO_3$ that is generated on the surface of the particles is suppressed as much as possible by reducing the carbon dioxide gas concentration in the calcination atmosphere during the calcination process. Therefore, applying this technique to the production of a LiNiMn type or LiNiMnCo type positive electrode active material in which there is only a small amount of lithium that originally exists on the surfaces of the particles is difficult.

As a condition for obtaining a non-aqueous electrolyte secondary battery having good performance, in addition to regulating the carbon content as described above, positive electrode active material that includes particles having a small particle size and narrow particle size distribution is desired. By using particles having a small particle size, it is possible to increase the specific surface area, and thus it is possible to sufficiently maintain a reaction surface between the positive electrode active material and the electrolyte, and it is possible to make the positive electrode thin and shorten the migration length for the lithium ions between the positive electrode and negative electrode, so it is possible to reduce the positive electrode resistance. By employing a narrow particle size distribution, it is possible to make the voltage applied to the particles inside an electrode uniform, and thus it is possible to suppress a decrease in the battery capacity due to selective degradation of minute particles.

For example, JP2011116580 (A) and WO2012/131881 (A1) disclose obtaining a positive electrode active material by taking a nickel manganese composite hydroxide that was obtained by a crystallization process in which a nucleation process and particle growth process are clearly separated as a precursor, and wherein the average particle size is 2 μm to 8 μm, and an index [(d90−d10)/average particle size] that indicates the particle size distribution is 0.60 or less. In this kind of positive electrode active material, the particle size is comparatively small and the particle size distribution is narrow, so it is possible to improve the cycling characteristic and output characteristics of a secondary battery. Particularly, the positive electrode active material that is disclosed in WO2012/13188 (A1) has a hollow structure, so the reaction surface with the electrolyte is large, and thus it is possible to greatly improve the output characteristics.

However, particularly in the case of a LiNiMn type (including LiNiMnCo type) positive electrode active material, it is not possible to sufficiently obtain output characteristics that are inherent to a positive electrode active material by simply regulating the carbon content and improving only the particle shape of the positive electrode active material, so further improvement of this production method is desired.

RELATED LITERATURE

Patent Literature

[Patent Literature 1] JP2013021699 (A)
[Patent Literature 2] JP2005340186 (A)
[Patent Literature 3] JP2004327246 (A)
[Patent Literature 4] JP2011116580 (A)
[Patent Literature 5] WO2012/131881 (A1)

SUMMARY OF INVENTION

Problem to be Solved by Invention

An object of the present invention is to provide a positive electrode active material that is capable of improving output characteristics when used as positive electrode material in a non-aqueous electrolyte secondary battery. Moreover, another object of the present invention is to provide a production method for easily producing on an industrial scale this kind of positive electrode active material.

Means for Solving Problems

The production method for a positive electrode active material for a non-aqueous electrolyte secondary battery of the present invention is a production method for a positive electrode active material for a non-aqueous electrolyte secondary battery that includes a lithium transition metal composite oxide that is composed of secondary particles that are formed from aggregates of plural primary particles, and the method includes:

a mixing process of obtaining a lithium mixture by adding and mixing a lithium compound with a transition metal composite hydroxide that was obtained from a crystallization reaction or with heat-treated particles obtained by performing a heating process on the transition metal composite hydroxide; and a calcination process of performing calcination of the lithium mixture in an atmosphere having an oxygen concentration of 4% by volume or greater; wherein in the calcination process, carbon dioxide gas concentration in the atmosphere while the temperature is maintained at a calcination temperature is kept at 10% by volume or less, and preferably kept at 0.01% by volume to 5.5% by volume. It is possible to use lithium carbonate, lithium hydroxide, lithium nitrate and the like as a lithium compound. When lithium carbonate (including the case of a mixture of lithium carbonate and another lithium compound) is used, the carbon dioxide gas concentration in the atmosphere must be 10% by volume or less. However, when lithium compound other than lithium carbonate, such as lithium hydroxide, lithium nitrate and the like are used, the carbon dioxide concentration in the atmosphere must be 0.01% by volume or greater.

Preferably, when the lithium transition metal composite oxide has a composition that is expressed by a general expression (A): $Li_{1+u}Ni_xMn_yCo_zM_tO_2$ (where −0.05≤u≤0.20, x+y+z+t=1, 0.5≤x<0.7, 0≤y≤0.55, 0≤z≤0.4, 0≤t≤0.1, and M is one or more kind of additional element that is selected from among Al, Ti, V, Cr, Zr, Nb, Mo, Hf, Ta and W), the calcination temperature is 650° C. to 1000° C.

However, preferably, when the lithium transition metal composite oxide has a composition that is expressed by a general expression (B): $Li_{1+u}Ni_xMn_yCo_zM_tO_2$ (where −0.05≤u≤0.20, x+y+z+t=1, 0.3≤x<0.5, 0.1≤y≤0.4, 0.1≤z≤0.4, 0≤t≤0.1, and M is one or more kind of additional element that is selected from among Al, Ti, V, Cr, Zr, Nb, Mo, Hf, Ta and W), the calcination temperature is 800° C. to 980° C.

Preferably, lithium carbonate is used as the lithium compound.

The positive electrode active material for a non-aqueous electrolyte includes a lithium transition metal composite oxide that is expressed by a general expression (A): $Li_{1+u}Ni_xMn_yCo_zM_tO_2$ (where $-0.05 \leq u \leq 0.20$, $x+y+z+t=1$, $0.5 \leq x < 0.7$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W), or is expressed by a general expression (B): $Li_{1+u}Ni_xMn_yCo_zM_tO_2$ (where $-0.05 \leq u \leq 0.20$, $x+y+z+t=1$, $0.3 \leq x < 0.5$, $0.1 \leq y \leq 0.4$, $0.1 \leq z \leq 0.4$, $0 \leq t \leq 0.1$, and M is one or more kind of additional element that is selected from among Al, Ti, V, Cr, Zr, Nb, Mo, Hf, Ta and W), and the carbon content is 0.010% by mass to 0.100% by mass.

Preferably, the secondary particles of the lithium transition metal composite oxide include a hollow structure having a hollow section and an outer-shell section that is around the outside of the hollow section.

The non-aqueous electrolyte secondary battery includes a positive electrode, a negative electrode, a separator, and a non-aqueous electrolyte, and uses the positive electrode active material for a non-aqueous electrolyte as a positive electrode material for the positive electrode.

Effect of Invention

With the present invention, a positive electrode active material is provided in which the carbon content can be controlled to be within a necessary minimum specified range without having to perform a washing process after calcination that invites excessive elution of lithium, so is capable of improving the output characteristics of a non-aqueous electrolyte secondary battery. Moreover, the positive electrode active material of the present invention can be easily produced on an industrial scale. Therefore, the industrial significance of the present invention is very large.

MODES FOR CARRYING OUT INVENTION

Taking into consideration the problems described above, the inventors diligently researched conditions for obtaining a positive electrode active material for which it is possible to suppress the carbon content and display excellent battery characteristics as a positive electrode material for a non-aqueous electrolyte secondary battery without performing a washing process after a calcination process which causes excessive elution of lithium.

As a result, it was learned that by employing a production method in which a positive electrode active material is formed by using a nickel transition metal composite hydroxide that is obtained by a crystallization process such as disclosed in JP2011116580 (A) and WO2013/131881 (A1) as a precursor, and by making the oxygen concentration in the calcination process 4% by volume or more, making the calcination temperature 800° C. to 1000° C., and maintaining the carbon dioxide gas concentration at 0.01% by volume to 10% by volume while the material is maintained at the calcination temperature, it is possible to control the carbon content of the obtained positive electrode active material to be within a specified necessary minimum range.

The present invention was achieved based on this knowledge. In the following, the present invention will be explained in detail by dividing the explanation into "1. Positive electrode Active Material for a Non-aqueous Electrolyte Secondary Battery", "2. Production Method for a Positive electrode Active Material for a Non-aqueous Electrolyte Secondary Battery", and "3. Non-aqueous Electrolyte Secondary Battery."

1. Positive Electrode Active Material for a Non-Aqueous Electrolyte Secondary Battery (1) Composition The present invention is widely applied to a positive electrode active material for a non-aqueous electrolyte secondary battery that includes a lithium transition metal composite oxide. In other words, the present invention is applied to a LiNi type positive electrode active material, or in other words, to a positive electrode active material that includes a lithium nickel composite oxide that includes at least lithium and nickel. Particularly, the present invention is suitably applied to a LiNiMn type (including a LiNiMnCo type) positive electrode active material, or in other words, to a positive electrode active material that includes a lithium nickel manganese composite oxide or a lithium nickel manganese composite oxide that includes at least lithium, nickel and manganese (or lithium, nickel, manganese and cobalt).

Preferably, the positive electrode active material for a non-aqueous electrolyte secondary battery of the present invention (hereinafter, referred to as the "positive electrode active material") includes a lithium transition metal complex oxide that has a composition that is expressed by the general expression (A): $Li_{1+u}Ni_xMn_yCo_zM_tO_2$ (where $-0.05 \leq u \leq 0.20$, $x+y+z+t=1$, $0.5 \leq x < 0.7$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W), or is expressed by the general expression (B): $Li_{1+u}Ni_xMn_yCo_zM_tO_2$ (where $-0.05 \leq u \leq 0.20$, $x+y+z+t=1$, $0.3 \leq x < 0.5$, $0.1 \leq y \leq 0.4$, $0.1 \leq z \leq 0.4$, $0 \leq t \leq 0.1$, and M is one or more kind of additional element that is selected from among Al, Ti, V, Cr, Zr, Nb, Mo, Hf, Ta and W).

In the positive electrode active material of the present invention, the value of u that indicates the excess amount of lithium is no less than −0.05 and no greater than 0.50, and preferably is no less than 0 and no greater than 0.5, and more preferably is no less than 0 and no greater than 0.35, and even more preferably is no less than 0 and no greater than 0.20. When the value of u is less than −0.05, the positive electrode resistance of a secondary battery that uses this positive electrode active material increases, so it is not possible to improve the output characteristics. However, when the value of u is greater than 0.50, not only does the initial discharge capacity of a secondary battery decrease, the positive electrode resistance also increases.

When the value of x that indicates the nickel content is no less than 0.3 but less than 0.5, and the value of y that indicates the manganese (Mn) content is no less than 0.1, or in other words, when trying to obtain a positive electrode active material that includes a lithium transition metal composite oxide that is expressed by the general expression (B), preferably the value of u is no less than 0.10 and no greater than 0.16, and more preferably is no less than 0.12 and no greater than 0.15. As a result, it is possible to improve the battery characteristics even when the nickel content of the positive electrode active material is comparatively small.

Nickel is an element that contributes to the improvement of battery capacity. The value of x that indicates the nickel content is no less than 0.3 but less than 0.7. More specifically, when trying to obtain a positive electrode active material that includes a lithium transition metal composite oxide that is expressed by the general expression (A), the value of x is no less than 0.5 but less than 0.7, and preferably is no less than 0.55 and no greater than 0.68. However, when trying to obtain a positive electrode active material that includes a lithium transition metal composite oxide that is expressed by the general expression (B), the value of x is no less than 0.3 but less than 0.5, and preferably is no less than 0.33 and no greater than 0.45. When the value of x is less than 0.3, the battery capacity of a secondary battery that uses this positive electrode active material decreases. However, when the value of x is 0.7 or greater, the contents of the other elements decrease, and there is a possibility that it will not be possible to sufficiently obtain the effect of the other elements.

Manganese is an element that contributes to the improvement of thermal stability. The value of y that indicates the manganese content is equal to or less than 0.55. When the value of y is greater than 0.55, not only does the battery capacity of a secondary battery that uses this positive electrode active material decrease, but the positive electrode resistance increases. The value of y is preferably no less than 0.1 and no greater than 0.55, and more preferably is no less than 0.1 and no greater than 0.4. By regulating the manganese content to be within such a range, it is possible to easily obtain a positive electrode active material that has a hollow structure, and it is possible to further improve the output characteristics of the positive electrode active material.

Cobalt (Co) is an element that contributes to the improvement of the cycling characteristic. By including just a suitable amount of cobalt, a positive electrode active material is obtained that has a good cycling characteristic, or in other words, has high durability. The value of z that indicates the cobalt content is 0.4 or less, and preferably is no less than 0.1 and no greater than 0.4, and more preferably is no less than 0.2 and no greater than 0.35. When the value of z is greater than 0.4, the initial discharge capacity greatly decreases.

In addition, the positive electrode active material of the present invention can be such that the lithium transition method composite oxide includes additional elements M. As a result, it is possible to improve the durability and output characteristics of a secondary battery that uses this positive electrode active material.

As such additional elements M, it is possible to use one or more kind of element that is selected from among aluminum (Al), titanium (Ti), vanadium (V), chromium (Cr), zirconium (Zr), niobium (Nb), molybdenum (Mo), hafnium (Hf), tantalum (Ta) and tungsten (W). These additional elements can be appropriately selected according to the usage and required performance of a secondary battery that uses the obtained positive electrode active material.

The value of t that indicates the content of additional elements M is 0.1 or less, and preferably is no less than 0.001 and no greater than 0.02, and more preferably no less than 0.002 and no greater than 0.01. When the value of t is greater than 0.1, the metal elements that contribute to the Redox reaction decrease, so the battery capacity decreases.

The additional elements M can be crystallized together with the nickel, manganese and cobalt, and uniformly dispersed into a transition metal composite hydroxide (hereinafter, referred to as the "composite hydroxide"), however, it is also possible to cover the surface of secondary particles of the composite hydroxide with the additional elements M after the crystallization process. In that case, it is possible to obtain the effect of adding additional elements M by adding a smaller amount. Moreover, in a mixing process, it is also possible to mix the additional elements M with a lithium compound together with the composite hydroxide, or it is also possible to use these methods together. With either method, the amount included must be adjusted so that the composition is that of the general expression (A).

(2) Carbon Content

A feature of the present invention is regulating the carbon content in the positive electrode active material to a range of 0.010% by mass to 0.100% by mass.

The form of the existence of carbon in the positive electrode active material is not clear, however, a large portion is considered to be the existence of lithium carbonate on the surfaces of particles. Therefore, when the carbon content in the positive electrode active material becomes excessive, contact between the positive electrode active material and electrolyte is obstructed, and the positive electrode resistance increases.

However, the inventors learned through the research described above that a minute amount of carbon has the effect of promoting contact among the positive electrode active material, and when the carbon content is excessively reduced, that effect is not obtained, and conversely, the output characteristics of a secondary battery that uses this positive electrode active material are reduced.

In other words, with the present invention, the carbon content of the positive electrode active material is not simply reduced, but rather the effect that is obtained by including a minute amount of carbon in the positive electrode active material is actively utilized, making it possible to further improve the output characteristics of the obtained secondary battery.

From an aspect such as this, in the present invention, the carbon content in the positive electrode active material is controlled to be within the minimum necessary range of 0.010% by mass to 0.100% by mass, and preferably 0.010% by mass to 0.095% by mass, and more preferably 0.010% by mass to 0.060% by mass. When the carbon content is less than 0.010% by mass, it is not possible to obtain the effect described above. However, when the carbon content is greater than 0.100% by mass, contact between the positive electrode active material and the electrolyte is obstructed, and the output characteristics decrease.

The carbon content of the positive electrode active material can be measured, for example, by high-frequency combustion infrared analysis.

(3) Particle Structure

The positive electrode active material of the present invention includes secondary particles that are formed by an aggregation of plural primary particles, and particularly, a hollow structure with a hollow section inside the secondary particles with an outer shell section on the outside thereof is preferred. By having this kind of hollow structure, it is possible to increase the reaction surface area, and electrolyte is able to enter inside from the particle boundaries or spaces between the primary particles of the outer shell section, so insertion and desorption of lithium can also be performed on the reaction surfaces of the primary particle surfaces on the hollow side, and thus it is possible to further improve the output characteristics without obstructing the migration of lithium ions and electrons.

The structure of the secondary particles can be confirmed, for example, by embedding secondary particles in resin or the like, then forming observable cross-sectional surfaces by performing a cross-section polishing process or the like, and observing those cross sections with a scanning electron microscope (SEM).

(4) Average Particle Size

The positive electrode active material of the present inventions is such that the average particle size is preferably 2 μm to 8 μm, and more preferably 3 μm to 8 μm, and even more preferably 3 μm to 6.5 μm. Here, the average particle size means the volume-based mean particle size (MV) that is found by using a laser diffraction/scattering method.

When the average particle size is less than 2 μm, the packing density of the positive electrode active material when forming a positive electrode is reduced, and the battery capacity per volume of the positive electrode may decrease. However, when the average particle size is greater than 8 μm, the specific surface area of the positive electrode active material is reduced, and the boundary surface with the electrolyte decreases, so the positive electrode resistance may increase and the output characteristics may decrease.

(5) Particle Size Distribution

The positive electrode active material of the present invention is such that an index that indicates the extent of the particle size distribution is preferably 0.60 or less, and more preferably 0.55 or less. By having the index within such a range, it becomes possible to improve safety and output characteristics by suppressing the mixing of minute particles and coarse particles. The value of this index can be found by the volume integrated diameters (d90, d10) and the volume-based mean particle size (MV) found from laser diffraction/scattering analysis.

2. Production Method for a Positive Electrode Active Material for a Non-Aqueous Electrolyte Secondary Battery The production method for the positive electrode active material of the present invention is not limited as long as it is possible to achieve the composition and carbon content described above. However, according to the method that will be explained below, it is possible to keep the carbon content to the necessary minimum limit and produce the positive electrode active material of the present invention with high productivity without performing a washing process after the calcination process.

(1) Crystallization Process

With the present invention, as a precursor to the positive electrode active material, it is possible to use a composite hydroxide that is obtained from a crystallization reaction and expressed by the general expression (C): $Ni_xMn_yCo_zM_t(OH)_{2+\alpha}$ (where, $x+y+z+t=1$, $0.3 \leq x \leq 0.7$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W).

This kind of composite hydroxide is not particularly limited, and can be produced by a known method. For example, it is possible to use a composite hydroxide that is produced by a crystallization process such as disclosed in JP2011116580 (A) and WO2012/131881 (A1) in which the crystallization reaction is clearly divided into two stages: a nucleation process in which mainly nucleation is performed, and a particle growth process in which mainly particle growth is performed. With this kind of method, it is possible to easily obtain a composite hydroxide having a comparatively small particle size and narrow particle size distribution. Particularly, according to the method disclosed in WO2012/131881 (A1), it is possible to make composite hydroxide that has a structure that includes a center section of fine primary particles, and an outer shell section of plate-shaped primary particles that are larger than the fine primary particles. Therefore, by using this composite hydroxide as a precursor, it is possible to produce a positive electrode active material having a hollow structure such as described above. The conditions for the crystallization process are the same as the conditions disclosed in JP2011116580 (A) and WO2012/131881 (A1), so an explanation here is omitted.

(2) Heat Treatment Process

When using the composite hydroxide described above as a precursor to the positive electrode active material, heat treatment of the composite hydroxide can be performed before the mixing process so that heat-treated particles are mixed with the lithium compound. Here, the heat-treated particles are not only the composite hydroxide that is obtained by removing excess moisture in the heat treatment process, but can also include a transition metal composite oxide (hereinafter, referred to as the "composite oxide") that was converted during the heat treatment process and expressed by the general expression (D): $Ni_xMn_yCo_zM_tO_2$ ($x+y+z+t=1$, $0.3 \leq x \leq 0.7$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W), or a mixture of these.

By performing this kind of heat treatment process, it is possible to reduce the moisture that remains in the particles up to the calcination process to a fixed amount, so it is possible to prevent a variation in the ratio of the number of metal atoms and the number of lithium atoms in the obtained positive electrode active material from occurring.

In the heat treatment process, moisture only needs to be removed by an amount so that variation in the ratio of the number of metal atoms and the number of lithium atoms in the positive electrode active material does not occur, so the composite hydroxide does not absolutely need to be converted to composite oxide. However, in order to make the variation in the ratio of the number of atoms of each metal component and the number of atoms of lithium smaller, preferably all of the composite hydroxide is converted to composite oxide by heating the composite hydroxide to a condition equal to or greater than the decomposition condition.

The heating temperature in the heat treatment process is preferably about 105° C. to 750° C. However, in order to convert all of the composite hydroxide to composite oxide, the heating temperature is more preferably 400° C. or greater. When the heating temperature is less than 105° C., it is not possible to sufficiently remove the excess moisture in the composite hydroxide, so it may not be possible to suppress the variation described above. However, when the heating temperature is greater than 750° C., sintering proceeds excessively, and it will become impossible to obtain a composite oxide having a uniform particle size. By finding beforehand through analysis each metal component that is included in the heat-treated particles according to the heat treatment conditions and determining the mixture ratio with the lithium compound, it is possible to further suppress the variation described above.

The atmosphere in which heat treatment is performed is not particularly limited as long as the atmosphere is a non-reducing atmosphere, however, preferably heat treatment is performed in circulating air in which heat treatment can be easily performed.

The heat treatment time is also not particularly limited, however, when the time is less than one hour, it may not be possible to sufficiently remove the excess moisture from the composite hydroxide.

The equipment that is used in this kind of heat treatment is not particularly limited as long as it is possible to heat the composite hydroxide in a non-reducing atmosphere in which preferably there is air circulation; and an electric furnace in which gas is not generated can be suitably used.

(3) Mixing Process

The mixing process is a process of obtaining a lithium mixture in which lithium compound is mixed with composite hydroxide or heat-treated particles so that the ratio (Li/Me) of the number of lithium atoms (Li) with respect to the total number of metal atoms (Me) of the composite hydroxide or heat-treated particles is 0.95 to 1.50, and preferably 1.00 to 1.50, and more preferably 1.00 to 1.35, and even more preferably 1.00 to 1.20. In other words, the ratio Li/Me does not change after the calcination process, so it is necessary that the lithium compound be mixed with the composite hydroxide or heat-treated particles so that the ratio Li/Me of the lithium mixture that is obtained in the mixing process becomes the target ratio Li/Me of the positive electrode active material.

The lithium compound that is used for forming the lithium mixture is not particularly limited, however, in consideration of the ease of availability, lithium hydroxide, lithium nitrate, lithium carbonate or a mixture of these can be suitably used. Even of these, in consideration of the ease of handling and stability of quality, using lithium hydroxide, lithium carbonate, or a mixture of these is preferred. Particularly, by using lithium carbonate, it becomes possible in the calcination process to be described later to control the carbon dioxide gas concentration in the calcination atmosphere within a suitable range without having to introduce carbon dioxide gas into the calcination furnace.

The lithium mixture is preferably sufficiently mixed before calcination. When the mixture is insufficient, there may be variation in the ratio Li/Me between individual particles, and thus it may not be possible to obtain sufficient battery characteristics.

Moreover, it is possible to use a typical mixer for mixing, and for example, it is possible to use a shaker mixer, a V blender, a ribbon mixer, a Julia mixer, a Lodige mixer or the like. Whichever mixer is used, the composite hydroxide or heat-treated particles and the lithium compound should be sufficiently mixed, and should be done so that the shape of the composite hydroxide or heat-treated particles is not destroyed.

In the mixing process, it is possible to mix in compounds of additional elements M together with the lithium compound. Alternatively, it is also possible to cover the surfaces of secondary particles of the composite hydroxide or composite oxide with compounds of additional elements M, and then mix with the lithium compound. Furthermore, these methods can be used together. In either case, it is necessary that the additional elements M be suitably adjusted so that the composition becomes that of the general expression (A).

(4) Pre-calcination Process

When lithium hydroxide or lithium carbonate is used as the lithium compound, it is possible to perform pre-calcination after the mixing process and before the calcination process in which the lithium mixture is heated at a temperature lower than the calcination temperature such as 350° to 800° C., and preferably 450° C. to 780° C., or in other words, at the reaction temperature (pre-calcination temperature) of lithium hydroxide or lithium carbonate and composite oxide. When doing this, preferably heating is performed at the pre-calcination temperature for 1 hour to 10 hours, and more preferably 3 hours to 6 hours. By performing this kind of pre-calcination process, diffusion of lithium into the secondary particles of the composite hydroxide is promoted, and it is possible to obtain a more uniform lithium transition metal composite oxide.

Even without providing this kind of pre-calcination process, it is essentially possible to obtain an effect that is similar to that of pre-calcination by slowing the rate of temperature rise until the calcination temperature is reached in the calcination process that will be described later. In this case, by maintaining the temperature at near the pre-calcination temperature, it is possible to sufficiently cause diffusion of the lithium into the secondary particles of the composite oxide to proceed.

(5) Calcination Process

The calcination process is a process for obtaining a lithium transition metal composite oxide by performing calcination under specified conditions of the lithium mixture that was obtained in the mixing process, and then cooling to room temperature. In the present invention, the calcination furnace that is used in the calcination process is not particularly limited, however, from the aspect of adequately controlling the atmosphere inside the furnace, an electric furnace that does not generate gas is preferred, and either a batch type or continuous type furnace can be used.

[Calcination Temperature]

In the present invention, the calcination temperature of the lithium mixture must be suitably adjusted according to the composition of the target positive electrode active material. For example, when trying to obtain a positive electrode active material that includes a lithium transition metal composite oxide having the composition expressed by the general expression (A), the calcination temperature is preferably 650° C. to 1000° C. However, when trying to obtain a positive electrode active material that includes a lithium transition metal composite oxide having the composition expressed by the general expression (B), the calcination temperature is preferably 800° C. to 980° C., and more preferably 850° C. to 950° C. When the calcination temperature is lower than the range described above, lithium is not sufficiently diffused, and excess lithium and unreacted composite hydroxide or composite oxide may remain, or it may not be possible to obtain a lithium transition metal composite oxide having a high crystalline structure. However, when the calcination temperature is greater than the range described above, not only will intense sintering occur between secondary particles of the lithium transition metal composite oxide, but this will also invite abnormal particle growth to occur, so it may not be possible to maintain the spherical shape of the secondary particles.

[Calcination Time]

Of the calcination time, the time during which the calcination temperature is maintained (maintenance time) is preferably at least 1 hour or more, and more preferably 2 hours to 10 hours. When the maintenance time is less than one hour, it may not be possible to sufficiently form the lithium transition metal composite oxide.

The time of temperature rise from room temperature to the calcination temperature is not particularly limited, however, preferably is 1 hour to 5 hours, and more preferably 2 hours to 3 hours. When the time of temperature rise is less than 1 hour, it is not possible for the temperature of the composite hydroxide or the heat-treated particles to follow the rise in temperature inside the furnace, so the reaction during the slow portion of the temperature rise may not proceed sufficiently, and it may not be possible to obtain a uniform positive electrode active material. However, when the time of temperature rise is greater than 5 hours, productivity remarkably worsens.

[Calcination Atmosphere]

a) Oxygen Concentration

Throughout the calcination process, it is necessary that the oxygen concentration in the calcination atmosphere be 4% by volume or greater, and preferably 4% by volume to 25% by volume, and more preferably 10% by volume to 23% by volume, and even more preferably 18% by volume to 22% by volume.

Particularly, when using lithium hydroxide as the lithium compound, a large amount of water vapor may be generated when decomposing this lithium hydroxide and the oxygen concentration in the calcination atmosphere may greatly decrease, so it is very important that a flow of atmospheric air or oxygen be introduced into the calcination furnace and that the oxygen concentration inside the calcination furnace be maintained at 4% by volume or greater.

When the oxygen concentration is less than 4% by volume, it is not possible to sufficiently oxidize the composite hydroxide or heat-treated particles, and there is a possibility that the crystalline structure of the positive electrode active material that is obtained will decrease. The upper limit of the oxygen concentration is not particularly limited, however, when the oxygen concentration is excessively high, not only does this invite an increase in the production cost, but there is also a possibility that the carbon content in the positive electrode active material that is obtained will decrease. Therefore, preferably the oxygen concentration is 25% by volume or less.

b) Carbon Dioxide Gas Concentration

In the stage of maintaining the temperature at the calcination temperature, it is necessary that the carbon dioxide gas concentration in the calcination atmosphere be maintained in the range 10% by volume or less, and preferably 0.01% by volume to 5.0% by volume, and more preferably 0.01% by volume to 5.0% by volume.

When using lithium carbonate that includes carbon as the lithium compound, the carbon dioxide gas concentration in the calcination atmosphere greatly increases due to carbon dioxide gas that is generated when decomposing the lithium carbonate, so it is very important that the carbon dioxide gas concentration in the calcination atmosphere be maintained at 10% by volume or less.

In other words, when the carbon dioxide gas concentration in the calcination atmosphere is not adjusted when using lithium carbonate, the carbon dioxide gas concentration will exceed 10% by volume, and unreacted lithium carbonate will remain on the surface of the obtained positive electrode active material, so it will become impossible to sufficiently improve the output characteristics.

In this case, the method for adjusting the carbon dioxide gas concentration in the calcination atmosphere is not particularly limited, however, for example, when performing calcination of composite hydroxide or heat-treated particles using a continuous type calcination furnace, carbon dioxide gas and water vapor are generated on the inlet side of the calcination furnace, so from the outlet side toward the inlet side of the calcination furnace, air is introduced at a rate of 15 L/min to 50 L/min, and preferably 20 L/min to 30 L/min per $m^3$ of volume inside the furnace. When doing this, preferably the amount of exhaust from the calcination atmosphere that includes carbon dioxide gas is controlled according to the calcination conditions by limiting the exhaust port to be only the inlet side, and adjusting the balance between the exhaust pressure and the oxygen concentration inside the calcination furnace. When doing so, it is necessary to make sure that negative pressure does not occur inside the calcination furnace. With this kind of method, it is possible to easily maintain the carbon dioxide gas concentration in the calcination atmosphere to be within the range described above on the outlet side of the calcination furnace where the temperature is maintained at the calcination temperature.

As was described above, the existence of a minute amount of carbon has the effect of promoting contact among the positive electrode active material, and affects the output characteristics, so it is necessary for the carbon content in the positive electrode active material to be 0.010% by mass or greater; however, when using lithium carbonate, it is possible to make the carbon content inside the positive electrode active material a specified value or greater even when the carbon dioxide concentration inside the calcination atmosphere is taken to be 0% by volume.

However, when using lithium hydroxide or lithium nitrate that do not include carbon as the lithium compound, there is essentially no carbon source, so the carbon dioxide gas concentration in the calcination atmosphere becomes less than 0.01% by volume. In this case, the carbon content in the positive electrode active material becomes less than 0.010% by mass. Therefore, when using lithium hydroxide or lithium nitrate, it becomes necessary to perform control by separately supplying carbon dioxide gas inside the calcination furnace so as to maintain the carbon dioxide gas concentration in the calcination atmosphere to 0.01% by volume or greater.

By suitably performing control so that the carbon dioxide gas concentration inside the calcination atmosphere is 10% by volume or less when using lithium carbonate, or so as to be 0.01% by volume when using lithium hydroxide or lithium nitrate, it is possible to control the carbon content that is included in the positive electrode active material that is obtained to be within a suitable range, and thus it is possible to improve the output characteristics of a secondary battery that uses this positive electrode active material.

(6) Crushing

The secondary particles of the lithium transition metal composite oxide after the calcination process may be such that mutual aggregation or a light amount of sintering has occurred. In such a case, preferably the aggregate or sintered body of plural secondary particles are crushed, and by doing so, the average particle size and particle size distribution of the positive electrode active material can be adjusted to a suitable range. This crushing is an operation of breaking up aggregates by applying mechanical energy to the aggregates that include plural secondary particles that occurred due to sintered necking between secondary particles during calcination, and separating the secondary particles without destroying the secondary particles themselves.

It is possible to use a known method as the crushing method; for example, it is possible to use a pin mill, a hammer mill or the like. When performing crushing, preferably the crushing force is adjusted within a suitable range so that the secondary particles are not destroyed.

3. Non-aqueous Electrolyte Secondary Battery

The non-aqueous electrolyte secondary battery of the present invention includes the same components as a typical non-aqueous electrolyte secondary battery, such as a positive electrode, a negative electrode, a separator, a non-aqueous electrolyte and the like. The embodiment that will be explained below is only an example, and it is also possible to apply the non-aqueous electrolyte secondary battery of the present invention to embodiments in which various changes and improvements have been performed based on embodiments disclosed in this specification.

(1) Constituent Materials

[Positive Electrode]

The positive electrode of the non-aqueous electrolyte secondary battery, as will be described below for example, is made using the positive electrode active material of the present invention.

First, a positive electrode composite material is obtained by adding a conductive material, a binding agent, and as necessary, activated carbon for increasing the electric double layer capacity, to the positive electrode active material powder that is obtained according to the present invention, then a solvent is added to this positive electrode composite material for the purpose of adjusting the viscosity and dissolving the binding agent, and a positive electrode composite material paste is made by kneading these materials. When doing this, the respective mixed ratios of these elements in the positive electrode composite material paste are also important elements for determining the performance of the non-aqueous electrolyte secondary battery. When the solid content of the positive electrode composite material without the solvent is taken to be 100 parts by mass, it is preferred, as in the case of a positive electrode of a typical non-aqueous electrolyte secondary battery, that the amount of positive electrode active material included be 60 parts by mass to 95 parts by mass, the amount of conductive material included be 1 part by mass to 20 parts by mass, and the amount of binding agent included be 1 part by mass to 20 parts by mass.

The positive electrode composite material paste that is obtained is coated on the surface of an aluminum foil current collector, then dried to allow the solvent to scatter. As necessary, in order to increase the electrode density, pressure may be applied using a roll press or the like. In this way, it is possible to make a sheet-like positive electrode. The sheet-like positive electrode can be cut to a suitable size according to the battery to be obtained, and provided for making a battery. However, the method for producing the positive electrode is not limited to this kind of method, and the positive electrode could also be produced using other methods.

As the conductive material, it is possible for example to use graphite (natural graphite, man-made graphite, expanded graphite and the like), or a carbon black material such as acetylene black, Ketjen black and the like.

The binding agent serves the role of binding together active particles, so for example, it is possible to use a fluororesin such as polyvinylidene fluoride (PVDF), polytetrafluoroethylene (PTFE) and the like, fluororubber, ethylene propylene diene rubber, styrene butadiene, cellulose resin, polyacrylic acid and the like.

As the solvent it is specifically possible to use an organic solvent such as N-methyl-2-pyrrolidone.

[Negative Electrode]

The negative electrode is formed by mixing a binding agent with a negative electrode active material such as metal lithium, lithium alloy or the like that is capable of occlusion and desorption of lithium ions, adding a suitable solvent to obtain a paste-like negative electrode composite material paste, coating this negative electrode composite material paste on the surface of a metal foil such as a copper foil current collector, drying, and as necessary pressing in order to increase the electrode density.

As the negative electrode active material, it is possible, for example, to use an organic compound calcined body such as natural graphite, man-made graphite, phenolic resin or the like, and carbon powder such as coke. As the binding agent, it is possible to use a fluororesin such as PVDF as in the case of the positive electrode, and as the solvent for dispersing the negative electrode active material and binding agent, it is possible to use an organic solvent such as N-methyl-2-pyrrolidone as in the case of the positive electrode.

[Separator]

A separator is arranged between the positive electrode and the negative electrode. The separator separates the positive electrode and the negative electrode, and holds the electrolyte; and as this separator, it is possible to use a thin porous film of polyethylene, polypropylene or the like having many small pores.

[Non-Aqueous Electrolyte]

The non-aqueous electrolyte is an electrolyte obtained by dissolving a lithium salt as a supporting salt in an organic medium. As the supporting salt, it is possible to use $LiPF_6$, $LiBF_4$, $LiClO_4$, $LiAsF_6$, $LiN(CF_3SO_2)$, or a composite salt of these.

As the organic solvent, it is possible to use one kind alone, or a mixture of two or more kinds selected from among 1) a cyclic carbonate such as ethylene carbonate, propylene carbonate, butylene carbonate, trifluoro propylene carbonate and the like, 2) a chain carbonate such as diethyl carbonate, dimethyl carbonate, ethyl methyl carbonate, dipropyl carbonate and the like, 3) an ether compound such as tetrahydrofuran, 2-methyltetrahydrofuran, dimethoxyethane and the like, 4) a sulfur compound such as ethyl methyl sulfone, butane sultone and the like, and 5) a phosphorus compound such as triethyl phosphate, trioctyl phosphate and the like.

The non-aqueous electrolyte may also further include a radical scavenger, a surfactant, and a flame retardant.

(2) Shape and Construction of a Secondary Battery

For a non-aqueous electrolyte secondary battery of the present invention that includes a positive electrode, a negative electrode, a separator and a non-aqueous electrolyte as described above, various shapes such as a cylindrical shape, a layered shape and the like can be employed. Regardless of the shape that is used, the positive electrode and negative electrode are taken to be electrodes that are layered by way of a separator, non-aqueous electrolyte is impregnated in the obtained electrodes, current collector leads are used to connect between the positive electrode current collector and a positive electrode terminal that extends to the outside, and between the negative electrode current collector and a negative electrode terminal that extends to the outside, and the battery is sealed in a battery case to complete the non-aqueous electrolyte secondary battery.

(3) Characteristics

Figure 1:
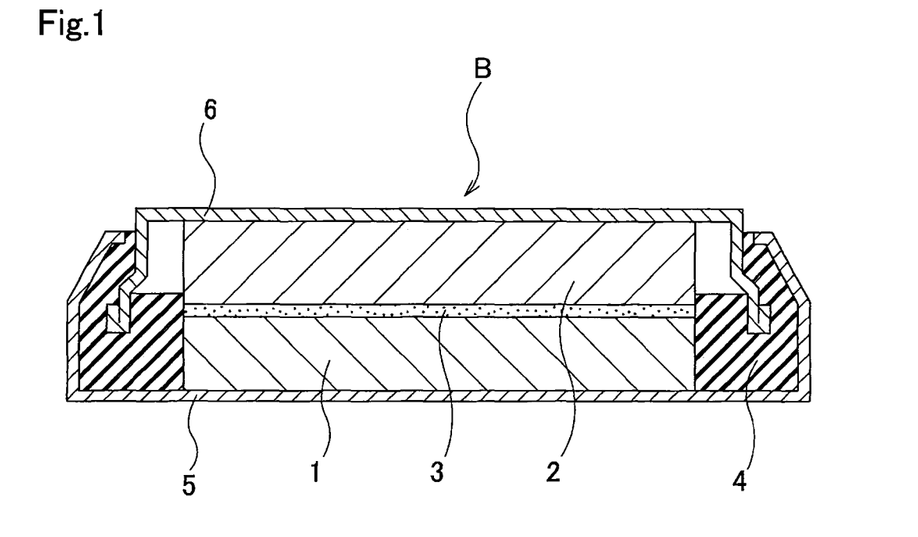
FIG. 1 is a cross-sectional view of a coin type battery that was used for battery evaluation.

A non-aqueous electrolyte secondary battery that uses the positive electrode active material of the present invention can be evaluated as having high capacity and excellent output characteristics. For example, when a 2032 type coin battery such as illustrated in FIG. 1 is constructed using the positive electrode active material of the present invention, it is possible to simultaneously achieve an initial discharge capacity of 156 mAh/g or greater, and preferably 158 mAh/g or greater, and a positive electrode resistance of 1.40Ω or less, and preferably 1.35Ω or less. Moreover, when compared with a secondary battery that used a conventional positive electrode active material that includes a lithium cobalt oxide or lithium nickel oxide, the thermal stability is high, and safety can also be said to be excellent.

(4) Uses

As described above, the non-aqueous electrolyte secondary battery of the present invention not only has low positive electrode resistance and high capacity, but safety can also be easily maintained, and it is possible to simplify the expensive protective circuitry. Therefore, the non-aqueous electrolyte secondary battery of the present invention can easily be made compact, and can be produced at low cost.

Accordingly, it can be said that the non-aqueous electrolyte secondary battery of the present invention is suitable as a power source for compact and portable electronic devices (notebook computers, portable telephone terminals and the like) in which mounting space is restricted, or for electric automobiles. The present invention can be used as not only a power source for electric automobiles that are purely driven by electric energy, but can also be used as a power source for so-called hybrid vehicles and used together with a combustion engine such as a gasoline engine, diesel engine and the like.

EXAMPLES

In the following, the present invention will be explained in detail using examples and comparative examples. However, the examples below are only examples and present invention is not limited by these examples. Moreover, in the examples and comparative examples given below, special grade materials manufactured by Wako Pure Chemical Industries, Ltd., were used for the transition metal composite hydroxide, positive electrode active material and in the production of a secondary battery.

Example 1

[Crystallization Process]
a) Nucleation Process

First, 250 L of water was put into a reaction tank with a baffle plate (500 L), and while stirring at a rotational speed of 350 rpm using an inclined paddle type stirring blade, the atmosphere inside the reaction tank in air was adjusted to be an oxidizing atmosphere having an oxygen concentration of about 20% by volume, and the liquid temperature inside the reaction tank was adjusted to 40° C. Next, by supplying an aqueous sodium hydroxide solution at 25% by mass and ammonia water at 25% by mass to the reaction tank, a pre-reaction aqueous solution having a pH value (at a reference liquid temperature of 25° C.) of 12.6 and ammonia concentration of 10 g/L was formed.

At the same time, a 2.0 mol/L mixed aqueous solution was prepared by dissolving nickel sulfate, manganese sulfate, cobalt sulfate and zirconium sulfate in water so that the mole ratio was Ni:Co:Mn:Zr=33.5:33.5 32:0.5.

An aqueous solution for nucleation was formed by supplying this mixed aqueous solution to the reaction tank at an addition rate of 1300 mL/min, and a crystallization reaction (nucleation) was performed. When performing nucleation, aqueous sodium hydroxide solution at 25% by mass and ammonia water at 25% by mass were appropriately supplied so that the pH value (at a reference liquid temperature of 25° C.) of the aqueous solution for nucleation was maintained at 12.6, and so that the ammonia concentration was maintained at 10 g/L.

b) Particle Growth Process

After the nucleation process, sulfuric acid at 32% by mass was supplied until the pH value (at a reference liquid temperature of 25° C.) became 11.6, after which nitrogen was circulated through the solution to create a non-oxidizing atmosphere with the oxygen concentration being 1% by volume or less, and by supplying ammonia water at 25% by mass so that the ammonia concentration became 10 g/L, an aqueous solution for particle growth was formed. While maintaining this state, the mixed aqueous solution was supplied into the reaction tank at an addition rate of 1300 mL/min. At the same time, by supplying a 2.0 mol/L aqueous solution, in which ammonium tungstate was dissolved, into the reaction tank at an addition rate of 45 mL/min, a crystallization reaction (particle growth) was performed.

After 2 hours had elapsed, the supply of all aqueous solutions and stirring of the aqueous solution for particle growth was stopped to promote the precipitation of generated product matter. After removing 250 L of only the supernatant, the supply of all aqueous solutions and stirring of the aqueous solution for particle growth was restarted, and the crystallization reaction (particle growth) was performed for another 2 hours. Throughout the nucleation process and particle growth process, the pH value of the aqueous solution for nucleation or the aqueous solution for particle growth was controlled by adjusting the amount of aqueous sodium hydroxide supplied using a pH controller so that the fluctuation range was ±0.2 with respect to the set value.

After causing the generated product matter to precipitate out after the end particle growth process, the product matter was washed, filtered and dried to obtain composite hydroxide powder. As a result of analysis using ICP atomic emission spectrophotometry, this composite hydroxide was confirmed to be expressed by the general expression: $Ni_{0.335}Co_{0.335}Mn_{0.32}Zr_{0.005}W_{0.005}(OH)_{2+a}$ (where $0 \leq a \leq 0.5$).

[Production of Positive Electrode Active Material]

Heat-treated particles were obtained by heating the obtained composite hydroxide using a hot-air dryer in an air current at 150° C. for 24 hours.

The heat-treated particles and lithium carbonate that was weighed so that Li/Me=1.14 were sufficiently mixed using a shaker mixer (TURBULA Type T2C, manufactured by Willy A. Bachofen (WAB)).

Next, this lithium mixture underwent pre-calcination using a continuous calcination furnace (manufactured by NGK) in an air current (oxygen concentration of 21% by volume) at 600° C. for 4 hours, after which calcination was performed by maintaining the mixture at a calcination temperature of 950° C. for 10 hours. While the mixture was maintained at the calcination temperature, the carbon dioxide gas concentration inside the furnace was maintained at 0.04% by volume by adjusting the amount of exhaust inside the furnace. After calcination, the mixture was allowed to cool to room temperature, and by performing crushing using a hammer mill, positive electrode active material was obtained.

As a result of analysis using ICP atomic emission spectrophotometry, this positive electrode active material was confirmed to be expressed by the general expression: $Li_{1.14}Ni_{0.335}Co_{0.335}Mn_{0.32}Zr_{0.005}W_{0.005}O_2$. Moreover, by performing measurement using high-frequency combustion infrared analysis (manufactured by Leco), the carbon content of this positive electrode active material was confirmed to be 0.024% by mass. Furthermore, this positive electrode active material was embedded in resin, and by using a cross-section polishing process to make cross-sectional observation possible, the cross section was observed using a scanning electron microscope, and as a result, it was confirmed that the positive electrode active material had a hollow structure.

[Production of a Secondary Battery]

A 2032 type coin battery (B) as illustrated in FIG. 1 was produced as described below using the obtained positive electrode active material.

First, a positive electrode (positive electrode for evaluation) (1) was produced by mixing 52.5 mg of positive electrode active material for a non-aqueous electrolyte secondary battery, 15 mg of acetylene black and 7.5 mg of polytetrafluoroethylene resin (PTFE), and pressing the mixture at a pressure of 100 MPa to a 11 mm diameter and 100 μm thickness, after which this positive electrode (1) was dried for 12 hours at 120° C. in a vacuum drier.

After drying, this positive electrode (1) was used to produce a 2032 type coin battery (B) inside a glove box in an Ar atmosphere for which the dew point was controlled to be −80° C. Lithium metal having a diameter of 17 mm and thickness of 1 mm was used for the negative electrode (2) of this 2032 type coin battery (B), and a mixture of equal amounts of ethylene carbonate (EC) and diethyl carbonate (DEC) having 1 M of $LiClO_4$ as a supporting electrolyte (manufactured by Toyama Pharmaceutical Industry Co. Ltd.) was used as the electrolyte. Moreover, porous polyethylene film having a film thickness of 25 μm was used as the separator (3). In addition to the construction described above, this 2032 type coin battery B included as gasket (4).

[Evaluation of the Secondary Battery]

The 2032 type coin battery (B) was left for about 24 hours after being produced, and after the open circuit voltage OCV became stable, the battery (B) was changed to a cutoff voltage of 4.3V with the current density with respect to the positive electrode taken to be 0.1 mA/cm², then one hour after charging was stopped, the capacity when the battery had discharged to a cutoff voltage of 3.0V was taken to be the initial discharge capacity, and was taken to be a measure of the charge/discharge capacity of the battery. When doing this, a multi-channel voltage/current generator (R6741A, manufactured by Advantest Corporation) was used for measuring the charge/discharge capacity.

Figure 2:
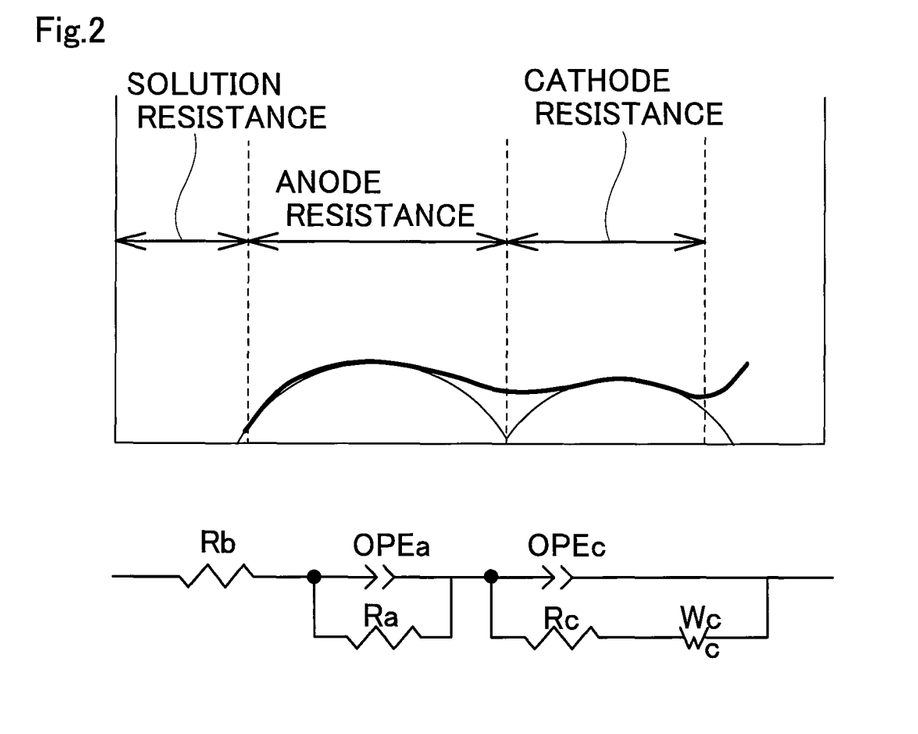
FIG. 2 is a figure for explaining an equivalent circuit that was used in measurement examples and analysis of impedance evaluation.

Moreover, the 2032 type coin battery (B) was charged with a charging potential of 4.1V, and measurement was performed by an AC impedance method using a frequency response analyzer and a potentio-galvanostat (1255B, manufactured by Solatron), and as a result, the Nyquist plot illustrated in FIG. 2 was obtained, and the positive electrode resistance was calculated by performing fitting calculation using an evaluation circuit based on this plot.

From these evaluation methods, it was confirmed that the 2032 type coin battery (B) of Example 1 had an initial discharge capacity of 160.3 mAh/g, and a positive electrode resistance of 1.01Ω. The results are given in Table 1.

Example 2

Except for circulating nitrogen gas in addition to air current and maintaining the oxygen concentration in the calcination atmosphere at 20% by volume throughout the calcination process, and maintaining the carbon dioxide gas concentration in the calcination atmosphere at 5.0% by volume by adjusting the amount of exhaust inside the furnace while the temperature was maintained at the calcination temperature, a positive electrode active material and secondary battery were obtained and evaluated in the same way as in Example 1. The results are given in Table 1.

Example 3

Except for circulating oxygen gas and nitrogen gas instead of air current and maintaining the oxygen concentration in the calcination atmosphere at 5% by volume throughout the calcination process, and maintaining the carbon dioxide gas concentration in the calcination atmosphere at 0% by volume by adjusting the amount of exhaust inside the furnace while the temperature was maintained at the calcination temperature, a positive electrode active material and secondary battery were obtained and evaluated in the same way as in Example 1. The results are given in Table 1.

Example 4

Except for circulating nitrogen gas in addition to air current and maintaining the oxygen concentration in the calcination atmosphere at 4% by volume throughout the calcination process, and maintaining the carbon dioxide gas concentration in the calcination atmosphere at 6.0% by volume by adjusting the amount of exhaust inside the furnace while the temperature was maintained at the calcination temperature, a positive electrode active material and secondary battery were obtained and evaluated in the same way as in Example 1. The results are given in Table 1.

Example 5

Except for circulating nitrogen gas in addition to air current and maintaining the oxygen concentration in the calcination atmosphere at 19% by volume throughout the calcination process, and maintaining the carbon dioxide gas concentration in the calcination atmosphere at 9.5% by volume by adjusting the amount of exhaust inside the furnace while the temperature was maintained at the calcination temperature, a positive electrode active material and secondary battery were obtained and evaluated in the same way as in Example 1. The results are given in Table 1.

Example 6

Except for circulating oxygen gas and nitrogen gas instead of air current and maintaining the oxygen concentration in the calcination atmosphere at 21% by volume throughout the calcination process, and maintaining the carbon dioxide gas concentration in the calcination atmosphere at 0.01% by volume by adjusting the amount of exhaust inside the furnace while the temperature was maintained at the calcination temperature, a positive electrode active material and secondary battery were obtained and evaluated in the same way as in Example 1. The results are given in Table 1.

Example 7

Except for making the calcination temperature 800° C., a positive electrode active material and secondary battery were obtained and evaluated in the same way as in Example 1. The results are given in Table 1.

Example 8

Except for making the calcination temperature 1000° C., a positive electrode active material and secondary battery were obtained and evaluated in the same way as in Example 1. The results are given in Table 1.

Example 9

Except for using lithium hydroxide as the lithium compound, and maintaining the carbon dioxide gas concentration in the calcination atmosphere at 0.04% by volume by adjusting the amount of exhaust inside the furnace while introducing carbon dioxide gas while the temperature was maintained at the calcination temperature, a positive electrode active material and secondary battery were obtained and evaluated in the same way as in Example 1. The results are given in Table 1.

Example 10

Except for producing a composite hydroxide by circulating nitrogen gas in the nucleation process and maintaining the oxygen concentration in a non-oxidizing atmosphere at 1% by volume or less, a positive electrode active material and secondary battery were obtained and evaluated in the same way as in Example 1. The results are given in Table 1. Observation of the cross section of the obtained positive electrode active material was performed using a scanning electron microscope in the same way as in Example 1, and as a result it was confirmed that the positive electrode active material had a hollow structure.

Comparative Example 1

Except for circulating nitrogen gas in addition to air current and maintaining the oxygen concentration in the calcination atmosphere at 15% by volume throughout the calcination process, and maintaining the carbon dioxide gas concentration in the calcination atmosphere at 30.0% by volume by adjusting the amount of exhaust inside the furnace while the temperature was maintained at the calcination temperature, a positive electrode active material and secondary battery were obtained and evaluated in the same way as in Example 1. The results are given in Table 1.

Comparative Example 2

Except for circulating nitrogen gas in addition to air current and maintaining the oxygen concentration in the calcination atmosphere at 18% by volume throughout the calcination process, and maintaining the carbon dioxide gas concentration in the calcination atmosphere at 15.0% by volume by adjusting the amount of exhaust inside the furnace while the temperature was maintained at the calcination temperature, a positive electrode active material and secondary battery were obtained and evaluated in the same way as in Example 1. The results are given in Table 1.

Comparative Example 3

Except for circulating nitrogen gas in addition to air current and maintaining the oxygen concentration in the calcination atmosphere at 13% by volume throughout the calcination process, and maintaining the carbon dioxide gas concentration in the calcination atmosphere at 38.0% by volume by adjusting the amount of exhaust inside the furnace while the temperature was maintained at the calcination temperature, a positive electrode active material and secondary battery were obtained and evaluated in the same way as in Example 1. The results are given in Table 1.

Comparative Example 4

Except for circulating only nitrogen gas instead of air current and maintaining the oxygen concentration in the calcination atmosphere at 0% by volume throughout the calcination process, and maintaining the carbon dioxide gas concentration in the calcination atmosphere at 0% by volume by adjusting the amount of exhaust inside the furnace while the temperature was maintained at the calcination temperature, or in other words making the calcination atmosphere a nitrogen atmosphere in which nitrogen gas was 100% by volume, a positive electrode active material and secondary battery were obtained and evaluated in the same way as in Example 1. The results are given in Table 1.

Comparative Example 5

Except for making the calcination temperature 750° C., a positive electrode active material and secondary battery were obtained and evaluated in the same way as in Example 1. The results are given in Table 1.

Comparative Example 6

Except for making the calcination temperature 1050° C., a positive electrode active material and secondary battery were obtained and evaluated in the same way as in Example 1. The results are given in Table 1.

Comparative Example 7

Except for using lithium hydroxide as the lithium compound, circulating oxygen gas and nitrogen gas instead of an air current, maintaining the oxygen concentration in the calcination atmosphere at 21% by volume, and making the carbon dioxide gas concentration in the calcination atmosphere at 0.0050% by volume as a result of not adjusting the amount of exhaust inside the furnace while the temperature was maintained at the calcination temperature, a positive electrode active material and secondary battery were obtained and evaluated in the same way as in Example 1. The results are given in Table 1.

TABLE 1

| | Calcination Process | | | | Positive Electrode Active Material | | Secondary Battery | |
|---|---|---|---|---|---|---|---|---|
| | | | Calcination Atmosphere | | | | Initial | Positive |
| | Calcination | Maintenance | Oxygen | Carbon Dioxide | | | Discharge | electrode |
| | Temperature (° C.) | Time (hr) | (% by volume) | Gas (% by volume) | Composition | C Content (% by mass) | Capacity (mAh/g) | Resistance (Ω) |
| Ex 1 | 950 | 10 | 21 | 0.04 | $Li_{1.14}Ni_{0.335}Co_{0.335}Mn_{0.32}Zr_{0.005}W_{0.005}O_2$ | 0.024 | 160.3 | 1.01 |
| Ex 2 | 950 | 10 | 20 | 5.0 | $Li_{1.14}Ni_{0.335}Co_{0.335}Mn_{0.32}Zr_{0.005}W_{0.005}O_2$ | 0.035 | 159.5 | 1.11 |
| Ex 3 | 950 | 10 | 5 | 0.0 | $Li_{1.14}Ni_{0.335}Co_{0.335}Mn_{0.32}Zr_{0.005}W_{0.005}O_2$ | 0.050 | 159.1 | 1.20 |
| Ex 4 | 950 | 10 | 4 | 6.0 | $Li_{1.14}Ni_{0.335}Co_{0.335}Mn_{0.32}Zr_{0.005}W_{0.005}O_2$ | 0.095 | 159.0 | 1.32 |
| Ex 5 | 950 | 10 | 19 | 9.5 | $Li_{1.14}Ni_{0.335}Co_{0.335}Mn_{0.32}Zr_{0.005}W_{0.005}O_2$ | 0.091 | 158.9 | 1.31 |
| Ex 6 | 950 | 10 | 21 | 0.01 | $Li_{1.14}Ni_{0.335}Co_{0.335}Mn_{0.32}Zr_{0.005}W_{0.005}O_2$ | 0.011 | 160.5 | 1.00 |
| Ex 7 | 800 | 10 | 21 | 0.04 | $Li_{1.14}Ni_{0.335}Co_{0.335}Mn_{0.32}Zr_{0.005}W_{0.005}O_2$ | 0.100 | 158.1 | 1.35 |
| Ex 8 | 1000 | 10 | 21 | 0.04 | $Li_{1.14}Ni_{0.335}Co_{0.335}Mn_{0.32}Zr_{0.005}W_{0.005}O_2$ | 0.015 | 157.3 | 1.25 |

TABLE 1-continued

| | Calcination Process | | | | | Secondary Battery | | |
|---|---|---|---|---|---|---|---|---|
| | | | Calcination Atmosphere | | | | Initial | Positive |
| | Calcination | Maintenance | Oxygen | Carbon Dioxide | Positive Electrode Active Material | | Discharge | electrode |
| | Temperature (° C.) | Time (hr) | (% by volume) | Gas (% by volume) | Composition | C Content (% by mass) | Capacity (mAh/g) | Resistance (Ω) |
| Ex 9 | 950 | 10 | 21 | 0.04 | $Li_{1.14}Ni_{0.335}Co_{0.335}Mn_{0.32}Zr_{0.005}W_{0.005}O_2$ | 0.010 | 160.4 | 1.04 |
| Ex 10 | 950 | 10 | 21 | 0.04 | $Li_{1.14}Ni_{0.335}Co_{0.335}Mn_{0.32}Zr_{0.005}W_{0.005}O_2$ | 0.021 | 160.1 | 1.24 |
| CE 1 | 950 | 10 | 15 | 30.0 | $Li_{1.14}Ni_{0.335}Co_{0.335}Mn_{0.32}Zr_{0.005}W_{0.005}O_2$ | 0.200 | 154.0 | 1.49 |
| CE 2 | 950 | 10 | 18 | 15.0 | $Li_{1.14}Ni_{0.335}Co_{0.335}Mn_{0.32}Zr_{0.005}W_{0.005}O_2$ | 0.140 | 155.0 | 1.41 |
| CE 3 | 950 | 10 | 13 | 38.0 | $Li_{1.14}Ni_{0.335}Co_{0.335}Mn_{0.32}Zr_{0.005}W_{0.005}O_2$ | 0.250 | 151.0 | 1.63 |
| CE 4 | 950 | 10 | 0 | 0.0 | $Li_{1.14}Ni_{0.335}Co_{0.335}Mn_{0.32}Zr_{0.005}W_{0.005}O_2$ | 0.300 | 130.0 | 2.10 |
| CE 5 | 750 | 10 | 21 | 0.04 | $Li_{1.14}Ni_{0.335}Co_{0.335}Mn_{0.32}Zr_{0.005}W_{0.005}O_2$ | 0.13 | 155.1 | 1.52 |
| CE 6 | 1050 | 10 | 21 | 0.04 | $Li_{1.14}Ni_{0.335}Co_{0.335}Mn_{0.32}Zr_{0.005}W_{0.005}O_2$ | 0.011 | 150.5 | 1.55 |
| CE 7 | 950 | 10 | 21 | 0.0050 | $Li_{1.14}Ni_{0.335}Co_{0.335}Mn_{0.32}Zr_{0.005}W_{0.005}O_2$ | 0.007 | 160.8 | 0.90 |

*) Ex: Example;
CE: Comparative Example

[Evaluation]

In the case of the positive electrode active material of Examples 1 to 10 that were produced according to the production method of the present invention, it was confirmed that the carbon content was in the range 0.020% by mass to 0.100% by mass, and that an initial discharge capacity of 156 mAh/g or greater and positive electrode resistance of 1.40Ω were simultaneously achieved.

However, in the case the positive electrode active material of Comparative Examples 1 to 3, the carbon dioxide concentration in the atmosphere while the temperature was maintained at the calcination temperature was greater than 10% by volume, so the carbon content became excessive, the initial discharge capacity could not be made to be 156 mAh/g or greater, and the positive electrode resistance could not be controlled to be 1.40Ω or less. In the case of the positive electrode active material of Comparative Example 7, however, lithium hydroxide was used as the lithium compound, and the carbon dioxide gas concentration in the atmosphere while the temperature was maintained at the calcination temperature was 0.0050% by volume, so the resistance decreased too much due to insufficient carbon content, and thus it became easy for current to flow at the time of a short-circuit and safety was reduced.

Moreover, in the case of the positive electrode active material of Comparative Example 4, the oxygen concentration in the calcination atmosphere was 0% by volume, so abnormal particle growth occurred due to oxygen deficiency, uniformity in the reaction among particles was lost, and it was not possible to improve either the initial discharge capacity or the positive electrode resistance.

However, in the case of the positive electrode active material of Comparative Examples 5 and 6, the calcination temperature was not within the range of the present invention, so crystallinity was insufficient and excessive sintering occurred, and for that reason neither the initial discharge capacity nor the positive electrode resistance could be sufficiently improved.

The positive electrode active material of Examples 1 to 10 and Comparative Examples 1 to 7 were measured using a laser diffraction/scattering type particle size distribution measuring device (Microtrac HRA, manufactured by Nikkiso Co., Ltd.) and it is was confirmed that in each case the average particle size was in the range 2 μm to 8 μm, and the index [(d90−d10)/average particle size] that indicates the extent of the particle size distribution was 0.60 or less.

From the above, it was confirmed that with the production method of the present invention, it is possible to obtain a secondary battery having excellent initial discharge capacity and output characteristics.

EXPLANATION OF REFERENCE NUMBERS

1 Positive electrode
2 Negative electrode
3 Separator
4 Gasket
5 Positive electrode can
6 Negative electrode can
B Coin battery

The invention claimed is:

1. A positive electrode active material for a non-aqueous electrolyte that includes a lithium transition metal composite oxide that is composed of secondary particles that are formed from aggregates of plural primary particles and is expressed by a general expression (A): $Li_{1+u}Ni_xMn_yCo_zM_tO_2$, where $-0.05 \leq u \leq 0.20$, $x+y+z+t=1$, $0.5 \leq x < 0.7$, $0 \leq y \leq 0.55$, $0 \leq z \leq 0.4$, $0 \leq t \leq 0.1$, and M is one or more kind of additional element that is selected from among Al, Ti, V, Cr, Zr, Nb, Mo, Hf, Ta and W,
   wherein the lithium transition metal composite oxide includes carbon that exists on a surface of the secondary particles in the form of lithium carbonate, and the carbon content measured by high-frequency combustion infrared analysis of the positive electrode active material is 0.010% by mass to 0.100% by mass.

2. A positive electrode active material for a non-aqueous electrolyte that includes a lithium transition metal composite oxide that is expressed by a general expression (B): $Li_{1+u}Ni_xMn_yCo_zM_tO_2$, where $-0.05 \leq u \leq 0.20$, $x+y+z+t=1$, $0.3 \leq x \leq 0.5$, $0.1 \leq y \leq 0.4$, $0.1 \leq z \leq 0.4$, $0 \leq t \leq 0.1$, and M is one or more kind of additional element that is selected from among Al, Ti, V, Cr, Zr, Nb, Mo, Hf, Ta and W,
   wherein the lithium transition metal composite oxide includes carbon that exists on a surface of the secondary particles in the form of lithium carbonate, and the carbon content measured by high-frequency combustion infrared analysis of the positive electrode active material is 0.010% by mass to 0.100% by mass.

3. The positive electrode active material for a non-aqueous electrolyte according to claim 1, wherein the secondary particles of the lithium transition metal composite oxide comprise a hollow structure having a hollow section and an outer-shell section that is around the outside of the hollow section.

4. A non-aqueous electrolyte secondary battery comprising a positive electrode, a negative electrode, a separator and a non-aqueous electrolyte, and that uses the positive electrode active material for a non-aqueous electrolyte according to claim 1 as a positive electrode material for the positive electrode.

\* \* \* \* \*